United States Patent
Merritt et al.

(10) Patent No.: US 11,658,542 B2
(45) Date of Patent: May 23, 2023

(54) CABIN AIR COMPRESSOR WITH LIQUID COOLED JACKET

(71) Applicant: Hamilton Sundstrand Corporation, Charlotte, NC (US)

(72) Inventors: Brent J. Merritt, Southwick, MA (US); Darryl A. Colson, Suffield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 190 days.

(21) Appl. No.: 17/132,749

(22) Filed: Dec. 23, 2020

(65) Prior Publication Data
US 2022/0194601 A1    Jun. 23, 2022

(51) Int. Cl.
*H02K 5/20* (2006.01)
*B64D 13/08* (2006.01)
*B64D 13/06* (2006.01)

(52) U.S. Cl.
CPC ............. *H02K 5/203* (2021.01); *B64D 13/08* (2013.01); *B64D 2013/0644* (2013.01)

(58) Field of Classification Search
CPC ............ H02K 5/203; B64D 13/08; B64D 2013/0644; F04D 25/06; F04D 29/5806
See application file for complete search history.

(56) References Cited

U.S. PATENT DOCUMENTS

| | | | |
|---|---|---|---|
| 7,675,209 B2 | 3/2010 | Masoudipour et al. | |
| 2007/0065317 A1* | 3/2007 | Stock | F04D 29/053<br>417/423.11 |
| 2008/0168796 A1* | 7/2008 | Masoudipour | F04D 25/06<br>62/505 |
| 2016/0186777 A1* | 6/2016 | Colson | F04D 29/4226<br>417/366 |
| 2017/0274728 A1* | 9/2017 | Suzuki | B60H 1/3223 |

FOREIGN PATENT DOCUMENTS

| | | |
|---|---|---|
| CN | 203537174 U | 4/2014 |
| CN | 103532308 B | 3/2016 |
| CN | 108700071 A | 10/2018 |
| DE | 102006003372 A1 | 8/2007 |
| EP | 2422429 B1 | 9/2017 |
| JP | 2004343857 A | 12/2004 |

OTHER PUBLICATIONS

European Search Report; dated May 16, 2022; Application No. 21217089.8; Filed: Dec. 22, 2021; 9 pages.

* cited by examiner

*Primary Examiner* — Jacob M Amick
*Assistant Examiner* — Charles J Brauch
(74) *Attorney, Agent, or Firm* — Cantor Colburn LLP

(57) ABSTRACT

Disclosed is a cabin air compressor (CAC) of an aircraft environmental control system, the CAC having: a CAC case defining a forward end, an aft end axially spaced apart from the forward end, wherein the forward end defines a compressor inlet; and a supplemental cooling jacket, positioned around at least a portion of the CAC case and at least partially conforming the CAC case, and wherein the supplemental cooling jacket is configured to direct a cooling medium through it.

7 Claims, 3 Drawing Sheets

006CABIN AIR COMPRESSOR WITH LIQUID COOLED JACKET

BACKGROUND OF THE INVENTION

The subject matter disclosed herein relates to aircraft environmental control and more specifically to a cabin air compressor with a liquid cooled jacket.

Environmental control systems (ECS) are utilized on various types of aircraft for several purposes, such as in cooling systems for the aircraft. For example, components of the ECS may be utilized to remove heat from various aircraft lubrication and electrical systems and/or used to condition aircraft cabin air. The cabin air conditioner includes one or more cabin air compressors (CACs) which compress air entering the system, from an outside source or from a ram air system. The compressed air is delivered to an environmental control system to bring it to a desired temperature, and then the compressed air is delivered to the aircraft cabin. After passing through the cabin, the air is typically exhausted to the outside. The CACs are typically driven by air-cooled electric motors, which are cooled by a flow of cooling air typically drawn by the ram air system. Conditions of the CAC, such as heating of the components therein during use, are controlled to extend a useful life of the CACs.

BRIEF DESCRIPTION

Disclosed is a cabin air compressor (CAC) of an aircraft environmental control system, the CAC including: a CAC case defining a forward end, an aft end axially spaced apart from the forward end, wherein the forward end defines a compressor inlet; and a supplemental cooling jacket, positioned around at least a portion of the CAC case and at least partially conforming the CAC case, and wherein the supplemental cooling jacket is configured to direct a cooling medium through it.

In addition to any of the above aspects or as an alternate, the supplemental cooling jacket is formed form a synthetic fabric.

In addition to any of the above aspects or as an alternate, the cooling medium is a supplemental cooling medium.

In addition to any of the above aspects or as an alternate, the supplemental cooling medium is a liquid.

In addition to any of the above aspects or as an alternate, an inlet port and an outlet port of the supplemental cooling jacket are fluidly coupled via at least one internal passage or bladder within the supplemental cooling jacket.

In addition to any of the above aspects or as an alternate, the supplemental cooling jacket at least partially includes insulating material.

In addition to any of the above aspects or as an alternate, the supplemental cooling jacket is configured to cool a motor, a forward motor support bearing, and an aft motor support bearing of the CAC.

In addition to any of the above aspects or as an alternate, the supplemental cooling jacket at least partially includes a first passage through which a motor air cooling inlet channel of the CAC extends; the supplemental cooling jacket at least partially includes a defines a second passage through which a bearing air cooling inlet channel of the CAC extends; and the supplemental cooling jacket at least partially includes a third passage through which a cooling outlet channel of the CAC extends.

In addition to any of the above aspects or as an alternate, a forward end of the supplemental cooling jacket is configured to be removably attached to a flange of the CAC.

In addition to any of the above aspects or as an alternate, the inlet and outlet ports respectively include quick release adaptors.

In addition to any of the above aspects or as an alternate, an inlet portion of the CAC extends aft of the forward end to a diffuser portion of the CAC; the diffuser portion extends aft of the inlet portion to a compressor rotor portion of the CAC; the compressor rotor portion extends aft of the diffuser portion to a forward bearing portion of the CAC; the forward bearing portion extends aft of the diffuser portion to a motor portion of the CAC; the motor portion extends aft of the diffuser portion to an aft bearing portion of the CAC; and the aft bearing portion extends aft to the aft end of the CAC; wherein the supplemental cooling jacket extends over the aft bearing portion, the motor portion and the forward bearing portion of the CAC and the forward bearing portion of the CAC.

In addition to any of the above aspects or as an alternate, the supplemental cooling jacket terminates at the forward bearing portion of the CAC, adjacent the compressor rotor portion.

In addition to any of the above aspects or as an alternate, a forward journal bearing of the forward bearing portion is rotationally supported between a forward stationary member of the CAC case and a forward motor shaft operationally connected to the motor; an aft journal bearing of the aft bearing portion is rotationally supported between an aft stationary member of the CAC case and an aft motor shaft operationally connected to the motor.

In addition to any of the above aspects or as an alternate, a thrust bearing of the aft bearing portion is rotationally supported between the aft end of the CAC case and the aft motor shaft.

An aircraft is disclosed including an environmental control system, which includes a CAC having any of the above aspects.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
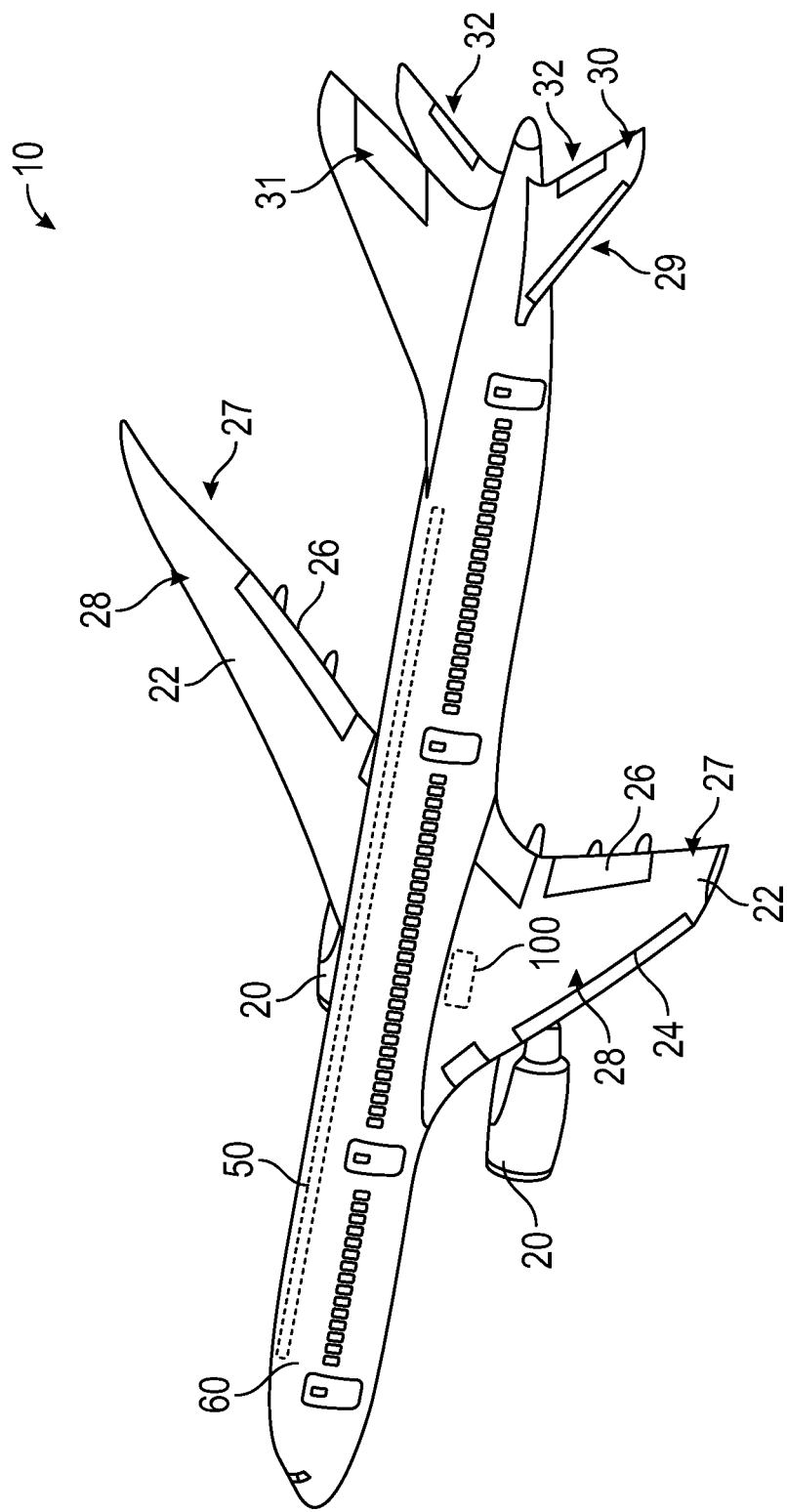
FIG. 1 is a perspective view of an aircraft where embodiments of the present invention can be implemented.

FIG. 1 illustrates an example of a commercial aircraft 10 having aircraft engines surrounded by (or otherwise carried in) a nacelle 20 housing therein a gas turbine engine. The aircraft 10 includes two wings 22 that can each include one or more slats 24 and one or more flaps 26. The aircraft may further include ailerons 27, spoilers 28, horizontal stabilizer trim tabs 29, horizontal stabilizer 30 and rudder 31, and vertical stabilizer 32 (the tail structure being collectively referred to as an and empennage) each of which may be typically referred to as "control surfaces" as they are movable under aircraft power systems. The aircraft 10 may include an environmental control system (ECS) 50, illustrated schematically, which conditions air that is delivered to the passenger cabin 60 of the aircraft 10. The ECS 50 may receive compressed air from a cabin air compressor (CAC) 100, as indicated above.

Figure 2:
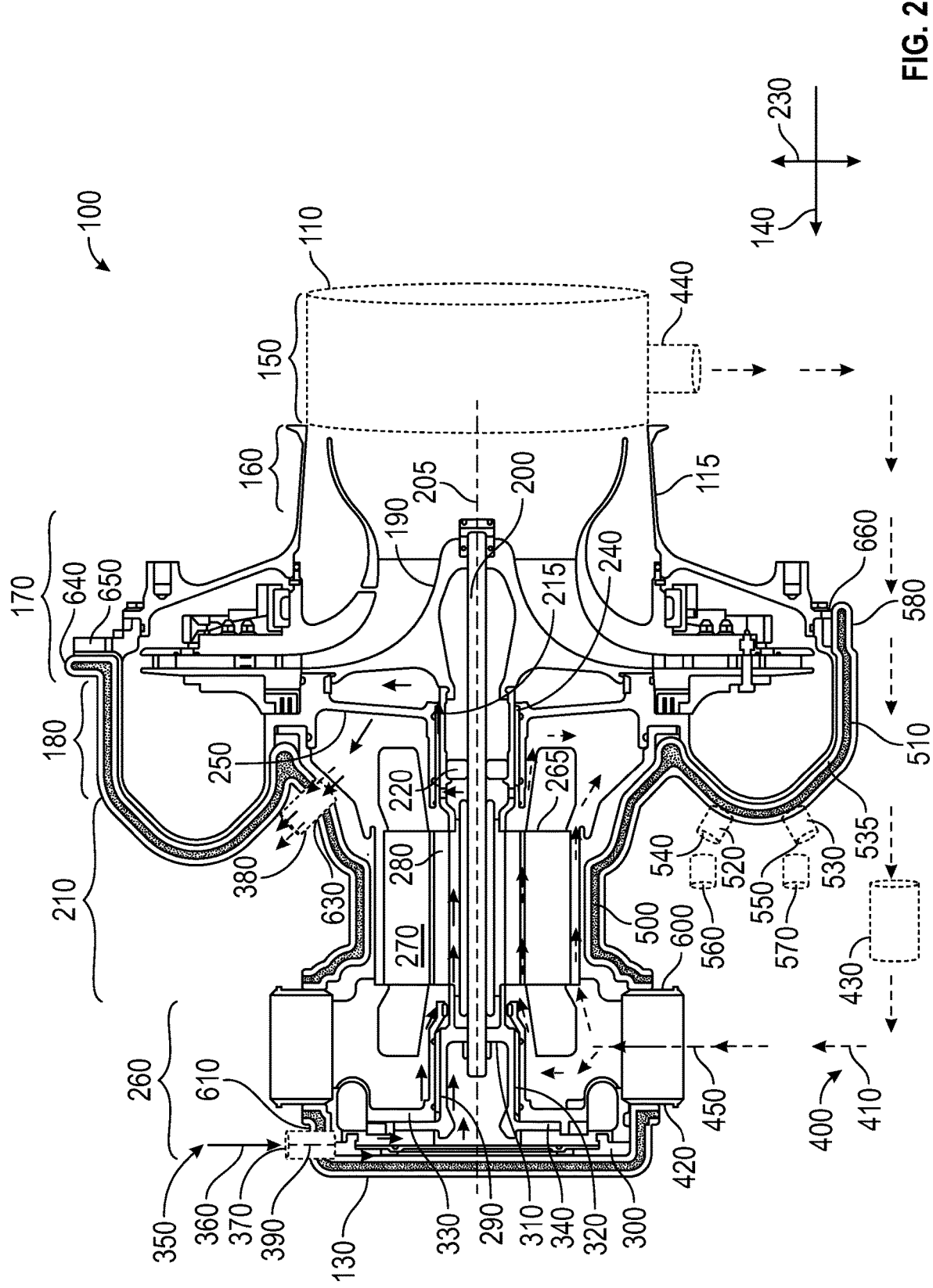
FIG. 2 is a cross-sectional view of a cabin air compressor (CAC) assembly with a liquid cooled jacket.

The components of a CAC 100 are shown in FIG. 2 and includes a CAC case 115 extending from a case forward end 110 to a case aft end 130, where the case aft end 130 is spaced apart from the case forward end 110 in an axial aft direction 140. An inlet portion 150 (otherwise referred to as a compressor inlet portion), shown schematically, is defined by the CAC 100, aft of the case forward end 110. The inlet portion 150 extends in the axial aft direction 140 from the case forward end 110 to an add heat portion 160 of the CAC 100. The inlet portion 150 of the CAC 100 receives, for example, air from outside the aircraft, e.g., from a ram air system of the aircraft 10.

The add heat portion 160 is defined by the CAC 100, aft of the inlet portion 150. The add heat portion 160 extends in the axial aft direction 140 from the inlet portion 150 to a compressor rotor portion 170 of the CAC 100

The compressor rotor portion 170 is defined by the CAC 100, aft of the add heat portion 160. The compressor rotor portion 170 extends axially aft from the add heat portion 160 to a forward bearing portion 180. A compressor rotor 190 is housed within the compressor rotor portion 170. The compressor rotor 190 rotates about a compressor drive rod 200 (or center drive rod) that extends in the axial aft direction 140 from the compressor rotor 190, toward the case aft end 130, and rotates about a rotation axis 205 (or center rotation axis).

The forward bearing portion 180 is defined by the CAC 100, aft of the compressor rotor portion 170. The forward bearing portion 180 extends in the axial aft direction 140 from the compressor rotor portion 170 to a motor portion 210. The compressor drive rod 200 extends axially through the forward bearing portion 180 of the CAC 100. A forward motor shaft 215 within the forward bearing portion 180 supports the compressor drive rod 200 via a forward drive rod support 220 that extends in the radial outer direction 230 between the forward motor shaft 215 and compressor drive rod 200. A forward journal bearing 240 (or forward motor support bearing) within the forward bearing portion 180 is rotationally positioned between a forward case structure 250 (or stationary member) and the forward motor shaft 215.

The motor portion 210 of the CAC 100 is defined by the CAC 100, aft of the forward bearing portion 180. The motor portion 210 extends in the axial aft direction 140, from the forward bearing portion 180 to an aft bearing portion 260. A motor 265, including a motor stator 270 and a motor rotor 280, is housed within the motor portion 210. The motor stator 270 is radially exterior to and axially aligned with the motor rotor 280. The compressor drive rod 200 extends axially through the motor portion 210 of the CAC 100 and is operationally connected to the motor rotor 280, e.g., to drive the compressor rotor 190.

The aft bearing portion 260 of the CAC 100 is defined by the CAC 100, aft of the motor portion 210. The aft bearing portion 260 extends in the axial aft direction 140, from the motor portion 210 to the case aft end 130 of the CAC case 110. The compressor drive rod 200 extends the axial aft direction 140, into the aft bearing portion 260 of the CAC 100. An aft motor shaft 290 (or thrust shaft) extends in the axial aft direction 140 from the motor rotor 280 to a thrust plate 300 at the case aft end 130 of the CAC case 110. The aft motor shaft 290 supports the compressor drive rod 200 via an aft drive rod support 310 that extends in the radial outer direction 230 between the aft motor shaft 290 and compressor drive rod 200. An aft journal bearing 320 is within the aft bearing portion 260, rotationally supported between the aft motor shaft 290 and an aft support structure 330 (another stationary member) of the CAC case 110, thereby supporting the compressor drive rod 200. A thrust bearing 340 engages the thrust plate 300 at the aft end of the CAC case 110. The aft journal bearing 320 and thrust bearing 340 may together be considered aft motor support bearings.

Figure 3:
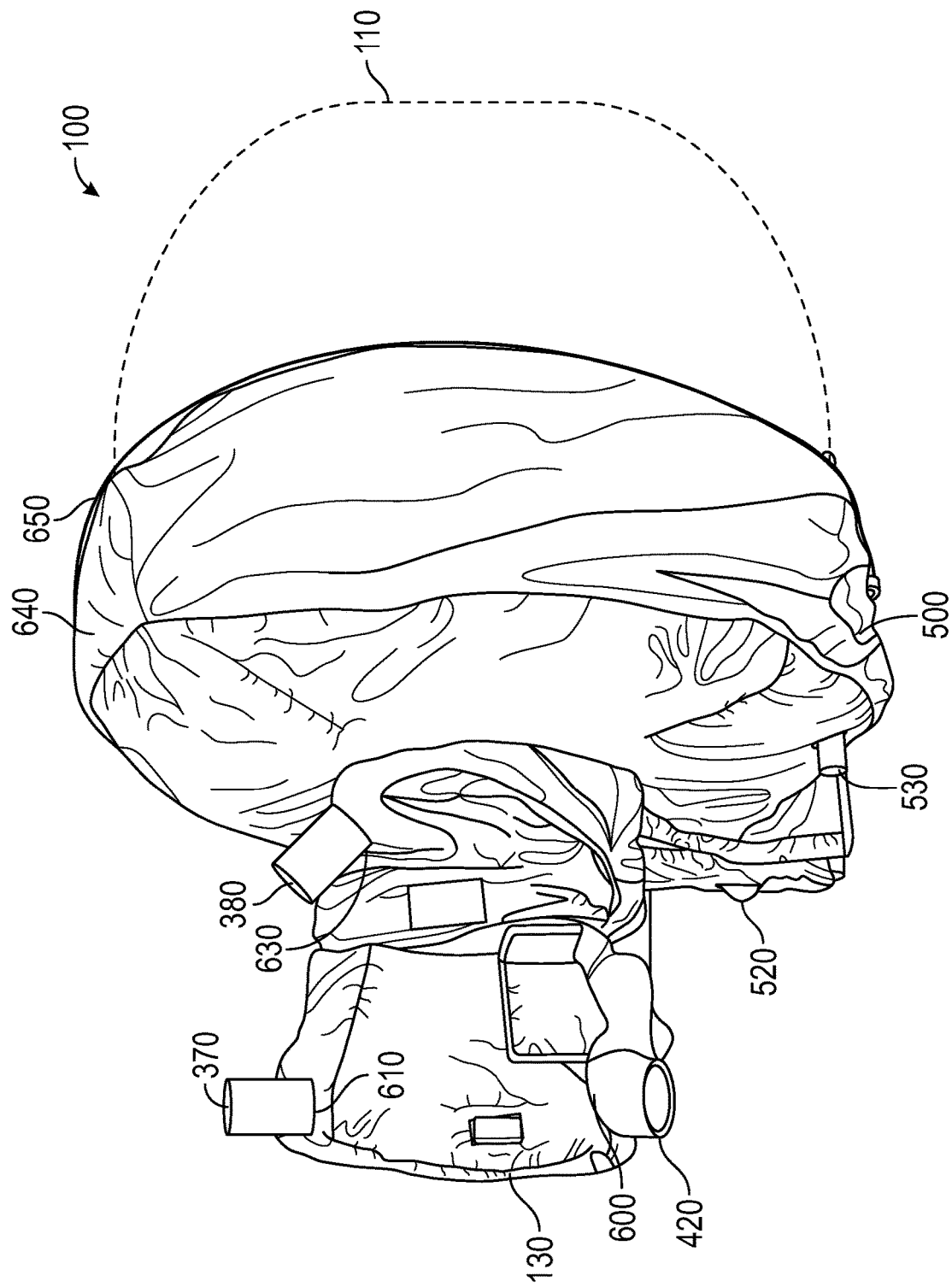
FIG. 3 is a perspective view of a CAC with a liquid cooled jacket.

Turning to FIG. 3, a bearing cooling circuit 350 is defined in the CAC 100 for directing a bearing cooling flow 360 of air through the CAC 100. The cooling air may also be from a primary heat exchanger of the aircraft or may be from a different source. The bearing cooling circuit 350 includes a bearing cooling inlet channel 370, formed as an inlet passage in the aft bearing portion 260 of the CAC case 110. A cooling outlet channel 380 is formed as an outlet passage in the forward bearing portion 180 of the CAC case 110. The CAC 100 is configured so that bearing cooling flow 360 is directed around the thrust bearing 340, over the aft journal bearing 320, between the compressor drive rod 200 and the motor rotor 280, over the forward journal bearing 240, and out of the cooling outlet channel 380. From there, the air may be directed overboard or utilized for other purposes. The bearing cooling inlet channel 370 may extend along a bearing cooling inlet channel axis 390 that is normal to the rotation axis 205 for the compressor rotor 190. This configuration is not intended on limiting an orientation of the bearing cooling inlet channel 370.

A motor cooling circuit 400 is defined in the CAC 100 for directing a motor cooling flow 410 of air through the CAC 100. The motor cooling circuit 400 includes a motor cooling inlet channel 420 formed in the aft bearing portion 260 of the CAC 100. The motor cooling inlet channel 420 receives the motor cooling flow 410 via a motor cooling duct 430 connected to a bleed channel 440 that is tapped off of the inlet portion 150 of the CAC 100. The CAC 100 is configured so that motor cooling flow 410 is directed between the motor rotor 280 and motor stator 270, between the motor stator 270 and the CAC case 110, and out of the cooling outlet channel 380. The motor cooling inlet channel 420 may extend along a motor cooling inlet channel axis 450 that is normal to the rotational axis for the compressor rotor 190, and e.g., parallel to bearing cooling inlet channel axis 390. This configuration is not intended on limiting an orientation of the bearing cooling inlet channel 370.

CAC motor reliability is dependent on the motor and bearings operating efficiently, meaning at least in part that the components are prevented from overheating. The CAC motor, as indicated above is cooled at least partially by cooling airflows, which under certain conditions may be insufficient to provide the desired cooling levels to the motor components. This may have a direct impact on system performance.

In view of the above concerns, as shown in FIGS. 2 and 3, the CAC 100 includes a supplemental cooling jacket 500 (the jacket). The jacket 500 is formed of a synthetic fabric, positioned around the CAC case 110 and conforms to the shape of the CAC case 110. The jacket 500 is configured to direct a supplemental cooling medium 510 through it. In one embodiment the supplemental cooling medium 510 is a liquid.

The jacket 500 includes an inlet port 520 (FIGS. 2 and 3) and an outlet port 530 (FIGS. 2 and 3), fluidly coupled via at least one internal passage or bladder 535 within the jacket 500. The inlet and the outlet ports 520, 530 may respectively include quick release adaptors 540, 550, to respectively connect with inlet and outlet conduits 560, 570. Further, the jacket 500 is at least partially filled with insulating material 580.

The jacket 500 is disposed around portions of the CAC case 110 that house the motor 265 and forward and aft journal bearings 240, 320. That is, the jacket 500 extends over the aft bearing portion 260, the motor portion 210 and the forward bearing portion 180 of the CAC 100. The jacket 500 terminates at the forward bearing portion 180 of the CAC 100, adjacent the compressor rotor portion 170. With this configuration, the forward bearing portion 180, the motor portion 210 and the aft bearing portion 260, and moving components therein, are configured to be cooled by the jacket 500.

For example, a primary heat removal circuit of the disclosed embodiments includes heat being removed from the motor portion 210, including the motor 265 therein, and the forward and aft bearing portions 180, 260, the bearings therein, including the forward and aft journal bearings 240, 320, and the thrust bearing 340, via convection by the motor cooling flow 410, and then by the motor cooling flow 410 being cooled by convection against the case 115. In turn, the case 115 conducts heat to the jacket 500, and the jacket 500 removes heat by convection via fluid flowing in the jacket 500

From the compressor rotor portion 170 to the forward case end 110, the CAC 100 is not covered by the jacket 500 (FIGS. 2 and 3). In some embodiments, the jacket 500 may be sized and configured to cover more or less of the CAC case 110, such as, for example, covering only the motor portion 210. In some embodiments, more than one jacket 500 is utilized, where each jacket covers one or more portions of the CAC case 110.

The jacket 500 may define a first passage or aperture 600 through which the motor air cooling inlet channel 420 (FIGS. 2 and 3) of the CAC 100 extends. The jacket 500 may further define a second passage or aperture 610 through which the bearing cooling inlet channel 370 of the CAC 100 extends. The jacket 500 may further define a third passage or aperture 630 through which the cooling outlet channel 380 of the CAC 100 extends. A forward end 640 of the jacket 500 may be removably attached to a flange 650 or other case mounting structure 660 of the CAC 100, to enable removal as needed.

Utilizing the above disclosed jacket 500 as an additional source of cooling, e.g., by cooling the CAC 110 around the motor 265, may greatly reduce motor stator and bearing temperatures, so that the stator motor operates more reliably and has a longer useful life. It is within the scope of the disclosure to utilize existing liquid cooling loops in an aircraft 10 to provide the liquid cooling flow to the CAC 100 to increase CAC reliability.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

We claim:

1. A cabin air compressor (CAC) of an aircraft environmental control system, the CAC comprising:
    a CAC case defining a forward end, an aft end axially spaced apart from the forward end, wherein the forward end defines a compressor inlet; and
    a supplemental cooling jacket, positioned around at least a portion of the CAC case and at least partially conforming the CAC case, and
    wherein the supplemental cooling jacket is configured to direct a cooling medium through it, wherein:
    an inlet portion of the CAC extends aft of the forward end to a diffuser portion of the CAC; the diffuser portion extends aft of the inlet portion to a compressor rotor portion of the CAC; the compressor rotor portion extends aft of the diffuser portion to a forward bearing portion of the CAC; the forward bearing portion extends aft of the diffuser portion to a motor portion of the CAC; the motor portion extends aft of the diffuser portion to an aft bearing portion of the CAC; and the aft bearing portion extends aft to the aft end of the CAC;
    the supplemental cooling jacket extends over the aft bearing portion, the motor portion and the forward bearing portion of the CAC so that the supplemental cooling jacket is configured to cool a motor of the motor portion, a forward motor support bearing, and an aft motor support bearing of the CAC;
    the supplemental cooling jacket terminates at a forward end of the supplemental cooling jacket, located at the forward bearing portion of the CAC that is adjacent the compressor rotor portion; and the forward end of the supplemental cooling jacket is configured to be removably attached to a flange of the CAC; and
    the supplemental cooling jacket is formed form a synthetic fabric, is at least partially filled with insulating material, and includes: a first aperture through which a motor air cooling inlet channel of the CAC extends; a second aperture through which a bearing air cooling inlet channel of the CAC extends; a third aperture through which a cooling outlet channel of the CAC extends; and an inlet port and an outlet port that are fluidly coupled via at least one internal passage or bladder within the supplemental cooling jacket.

2. The CAC of claim 1, wherein:
the cooling medium is a supplemental cooling medium.

3. The CAC of claim 2, wherein:
the supplemental cooling medium is a liquid.

4. The CAC of claim 1, wherein:
the inlet and outlet ports respectively include quick release adaptors.

5. The CAC of claim 1, wherein:
a forward journal bearing of the forward bearing portion is rotationally supported between a forward stationary member of the CAC case and a forward motor shaft operationally connected to the motor;
an aft journal bearing of the aft bearing portion is rotationally supported between an aft stationary member of the CAC case and an aft motor shaft that is operationally connected to the motor.

6. The CAC of claim 5, wherein:
a thrust bearing of the aft bearing portion is rotationally supported between the aft end of the CAC case and the aft motor shaft.

7. An aircraft comprising:
an environmental control system, including the CAC of claim 1.

* * * * *